R. F. CHATILLON.
SCALE.
APPLICATION FILED MAY 23, 1912.
1,220,191.
Patented Mar. 27, 1917.
Fig. 1
Fig. 2
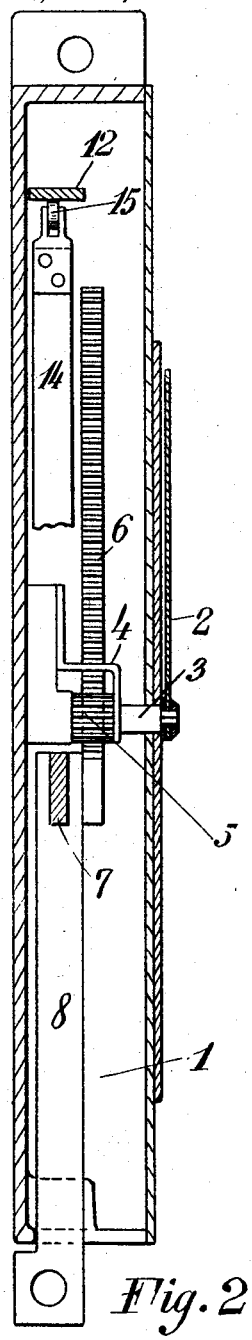
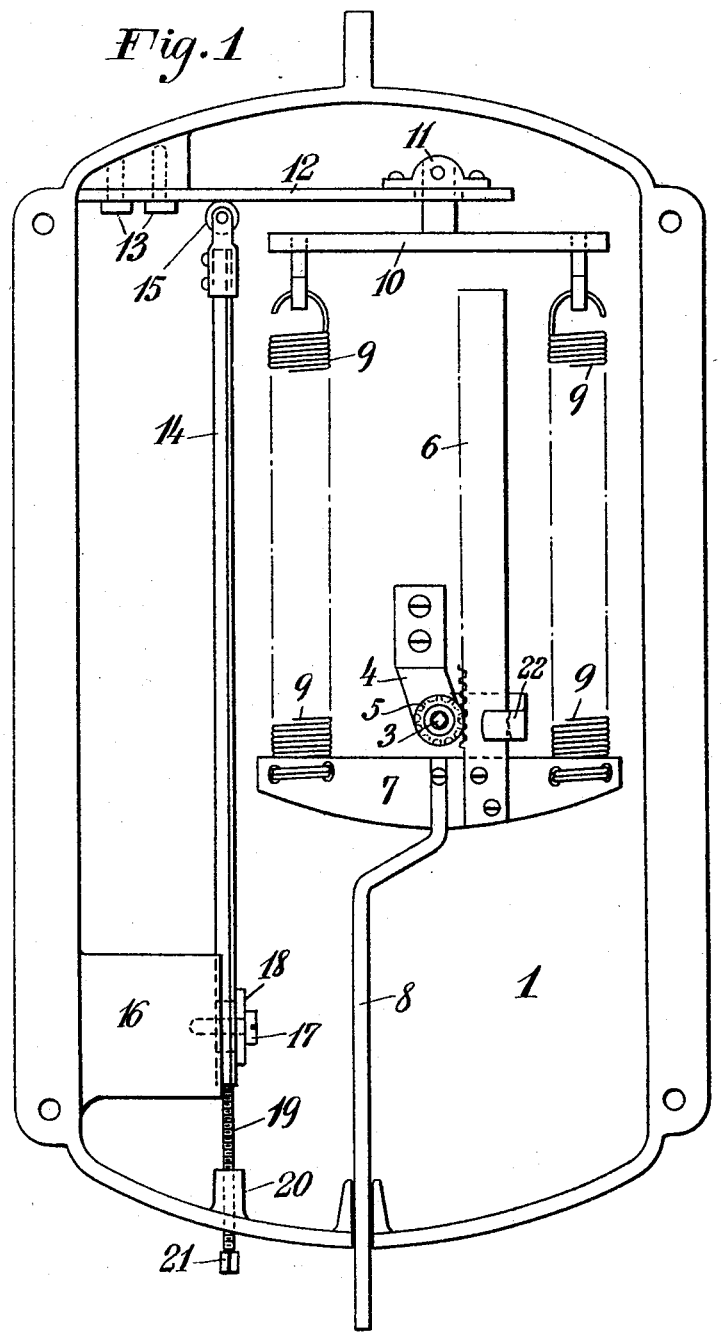
Witnesses:
Henry J. Lucke
M. C. Love
Inventor
Ralph F. Chatillon,
By his Attorneys
Edwards, Sager & Wooster

UNITED STATES PATENT OFFICE.

RALPH F. CHATILLON, OF GREENBURG, NEW YORK, ASSIGNOR TO JOHN CHATILLON & SONS, A CORPORATION OF NEW YORK.

SCALE.

1,220,191. Specification of Letters Patent. Patented Mar. 27, 1917.

Application filed May 23, 1912. Serial No. 699,103.

*To all whom it may concern:*

Be it known that I, RALPH F. CHATILLON, a citizen of the United States, residing at Greenburg, in the county of Westchester and State of New York, have invented certain new and useful Improvements in Scales, of which the following is a full, clear, and exact specification.

This invention relates to scales, and has particular reference to means for compensating for temperature variations in spring balances.

It is the object of this invention to combine a thermostat with a scale in such manner that the movement of the rack or other suitable gear element which actuates the pointer or indicator will be maintained constant for any given force as the temperature varies, to produce the same movement of the pointer on the dial or scale, independently of the temperature of the spring. For example, as the temperature of a spring increases, its strength will diminish, so that a given weight may distort the spring more at the higher temperature than at a lower temperature, thereby producing a greater movement of the pointer and indicating an apparently greater weight. The reverse also holds true, a scale not indicating in low temperature the true weight, the variation increasing as the gear ratio between the beam and the pointer increases.

I propose to compensate for temperature variations to maintain the distance of travel of the rack constant for any given weight by combining two or more springs and a thermostat which varies the resiliency of one spring at such a rate as to maintain the resultant movement of both springs constant for any given weight through a wide range of temperature.

Preferably, I attach the usual coil spring of a spring balance to a flat or lever spring which has a thermostatically movable fulcrum which varies its resiliency with the temperature and thereby maintains a constant correction in the scale for temperatures.

As shown herein, I provide a dial or scale and pointer or indicator of any suitable well known form, which is actuated by a movable rack connected to a bar carried at one end of the coil spring or springs, the opposite end of the spring or springs being resiliently supported by a flat lever spring whose fulcrum is regulated by the thermostat. As the temperature varies, the travel of the rack remains the same for a given weight because of an adjustment in the resiliency of the flat spring lever arm suspension. With decrease in temperature, the flat spring is automatically made sufficiently more flexible to neutralize the greater stiffness of the coil spring, and vice versa, so that the same weight is indicated irrespective of the temperature.

My invention will be more fully understood from the following description and in connection with the accompanying drawings, in which—

Figure 1 is a front elevation of a scale embodying my invention, with the face plate removed; and Fig. 2 is a vertical central sectional elevation of Fig. 1.

1 represents a casing of suitable form carrying on its front a dial (not shown) provided with a pointer or indicator 2 carried by the stud shaft 3 journaled in the hanger 4 carried by the casing 1, the shaft 3 carrying the driving pinion 5. The rack 6 is rigidly carried by the beam 7 to which the bar 8 is connected to which the hook, scale pan or the like is attached. The bar 8 is suitably guided by the casing so as to have a substantially vertical movement. 9, 9 represent coil springs attached to the beam 7 at the lower ends; in the scale specifically illustrated two coil springs 9 are employed. The upper ends of the coil springs 9 are detachably carried by the cross-beam 10, the latter being connected by the swivel joint 11 to the flat horizontal spring 12. As shown, the yieldable connection 11 is positioned at or near the free end of the flat spring 12, the fixed end of the spring 12 being rigidly secured to the casing 1, as by screws 13, or the like.

The thermostat 14 extends upwardly, and its upper end carries a roller 15, adapted to engage the lower face of the horizontal flat spring 12. The lower end of the thermostat 14 is adjustably fixed to a lug 16 on the casing 1. As indicated in Fig. 1, the thermostate 14 is held in a slot on the face of the lug 16 by the screw 17 and washer 18, the said screw 17 passing through a slot in the thermostat 14. The vertical adjustment of the thermostat 14 is obtained by the adjusting post 19 passing through a screw-threaded opening 20 in the casing 1, and having a thumb nut 21. Upon turning the thumb nut 21 to move the adjusting post 19 upwardly, the thermostat 14 will be moved the desired upward distance in the slot of the lug 16, the said screw 17 and washer 18 not being fully tightened, but sufficiently tightened to prevent the thermostat 14 from undue lateral movement. The adjustment is preferably such that at no load with the pointer or indicator at zero, the fulcrum can move freely longitudinally of the flat spring as the temperature varies, but as soon as a load is applied the flat spring contacts with the fulcrum and thereafter bends with the load between the fulcrum and the outer end. The component parts of the thermostat 14 are of approved construction and arranged so that upon increase in temperature the roller 15 at the free end of the thermostat 14 will be moved toward the free end of the flat spring 12, that is to the right as shown in Fig. 1, and upon decrease in temperature, the roller will be moved in the opposite direction.

It will be seen that the joint 11 is of a pivotal nature allowing a limited pivotal movement between the spring 12 and bar 10. The guide post 22 is provided to maintain substantially vertical line of movement of the rack 6. It will be noted, when the proper adjustment of the roller 15 of the thermostat 14 is once made, the effect of elevation in temperature causes the roller to shift toward the right, thereby moving the effective fulcrum of the spring 12 to the right, and since an increase in temperature gives rise to a greater displacement of the coil springs 9 when a given weight is attached to the bar 8, the effective give of the spring 12 is decreased a sufficient amount to compensate for the increased displacement of the coil springs 9. On the other hand, upon decrease in temperature, the roller 15 is shifted to the left, thereby shifting the effective fulcrum of the spring 12 to the left, so that the give of the spring 12 is increased a sufficient amount to compensate for the decreased displacement of the coil springs 9.

From the foregoing description it will be seen that I have provided a compound spring scale wherein the indication is due to the displacement of two springs in series, one of which is automatically varied in resiliency to render the resultant displacement due to a given force constant, independent of temperature variation. Various changes and modifications in the specific application of my invention may be made without departing from the scope of my invention.

Having thus described my invention, I declare that what I claim as new and desire to secure by Letters Patent is:—

1. A scale comprising a coil spring, a beam attached to said coil spring, an indicator actuated by said beam, a flat spring supporting at a free end said coil spring, and temperature controlled means for automatically moving the fulcrum of said flat spring in accordance with temperature variations.

2. A scale comprising a coil spring, a beam connected thereto, an indicator connected to said beam, multiplying gear connections, said gear connections including a rack connected to said beam, pivotal means for suspending said coil spring, and a thermostatically movable support for said pivotal means and movable relatively thereto to vary the effective pivotal point of the same in accordance with temperature variations.

3. A scale comprising a coil spring, a beam, an indicator connected to said beam, multiplying gear connections, said gear connections including a rack connected to said beam, pivotal means for suspending said coil spring, a movable support coöperating with said pivotal means, and a thermostat controlling said support to vary the effective pivotal point of the same in accordance with temperature variations.

4. In a scale, a thermostatic control device comprising an upwardly extending and laterally movable thermostatic element, means for stationarily supporting the lower end of said thermostatic element, and a spring scale mechanism comprising a lever having an intermediate fulcrum controlled by the position of said thermostat.

5. In a scale, a thermostatic control device comprising an upwardly extending and laterally movable thermostatic element, means for stationarily supporting the lower end of said thermostatic element, a spring scale mechanism comprising a lever having an intermediate fulcrum controlled by the position of said thermostatic element and means for adjusting the vertical position of said thermostatic element.

6. In a scale, a coil spring and supporting means therefor, said supporting means comprising a yieldable member stationarily positioned at one end, adjustable means responsive to variations in temperature adapted to automatically engage said element at varying distances from said stationarily positioned end, and a non-yieldable connection between said yieldable member and said coil spring.

7. In a scale, measuring means comprising indicating means, a leaf spring supported at one end and connected at its other end to said indicating means, a fulcrum between the ends of said spring, and thermostatic means for automatically varying the effective length of said spring according to temperature variations.

8. In a scale, measuring means comprising a flat spring and a coil spring supported thereby in series, and means for automatically varying the resiliency of one of said springs.

9. In a scale, measuring means comprising a flat spring and a coil spring arranged in series, and means for automatically varying the resiliency of said flat spring.

10. In a scale, measuring means comprising a flat spring and a coil spring arranged in series, and means for automatically varying the resiliency of one of said springs.

11. In a scale, measuring means comprising a flat spring and a coil spring supported thereby in series, and means for automatically varying the resiliency of said flat spring.

12. In a scale, measuring means comprising a coil spring, means including a flat spring fixed at one end for suspending said coil spring, and means for automatically varying the fulcrum and resulting resiliency of said flat spring in accordance with temperature variations.

13. A scale comprising an indicator, a beam connected to the load and having actuating connection with said indicator, a plurality of coil springs each connected at one end to said beam, a common support for the other ends of said coil springs, a flat spring mounted at one end on the frame and at the other end connected to said coil spring support, a fulcrum freely movable longitudinally of said flat spring at no load, and a thermostat for controlling said fulcrum.

In testimony whereof I affix my signature, in presence of two witnesses.

RALPH F. CHATILLON.

Witnesses:
J. S. WOOSTER,
G. N. KERR.

Copies of this patent may be obtained for five cents each, by addressing the "Commissioner of Patents, Washington, D. C."